US006964551B1

(12) United States Patent
Friesen

(10) Patent No.: US 6,964,551 B1
(45) Date of Patent: Nov. 15, 2005

(54) TRAILER FOR TRANSPORTING BULK SEED BOXES

(75) Inventor: Garry D. Friesen, Storm Lake, IA (US)

(73) Assignee: Friesen USA, Inc., Storm Lake, IA (US)

( * ) Notice: Subject to any disclaimer, the term of this patent is extended or adjusted under 35 U.S.C. 154(b) by 482 days.

(21) Appl. No.: 10/020,342

(22) Filed: Dec. 12, 2001

(51) Int. Cl.$^7$ .................................................. B60P 1/40
(52) U.S. Cl. .......................... 414/526; 410/77; 410/80; 414/505; 414/523
(58) Field of Search ................................ 414/503, 505, 414/523, 526; 410/72, 77, 80, 68, 71

(56) References Cited

U.S. PATENT DOCUMENTS

| | | | | |
|---|---|---|---|---|
| 1,675,701 | A * | 7/1928 | Fitch | 410/71 |
| 3,210,038 | A * | 10/1965 | Bader et al. | 410/77 |
| 3,314,633 | A * | 4/1967 | Romberg | 410/71 |
| 3,358,616 | A * | 12/1967 | Brodhead | 410/44 |
| 3,868,083 | A * | 2/1975 | Titcombe | 410/80 |
| 4,165,007 | A * | 8/1979 | Brown | 414/494 |
| 5,013,208 | A * | 5/1991 | Grieshop | 414/526 |
| 5,257,893 | A | 11/1993 | Sevits | |
| 5,465,829 | A | 11/1995 | Kruse | |
| 5,520,495 | A | 5/1996 | Sukup | |
| 5,628,608 | A * | 5/1997 | Linscheid et al. | 414/526 |
| 5,695,399 | A * | 12/1997 | Carlson et al. | 460/114 |
| 5,718,555 | A | 2/1998 | Swalheim | |
| 5,718,556 | A * | 2/1998 | Forsyth | 414/503 |
| 5,785,481 | A | 7/1998 | Ockels | |
| 6,053,692 | A * | 4/2000 | Mason et al. | 414/498 |
| 6,092,974 | A | 7/2000 | Roth | |
| 6,120,233 | A | 9/2000 | Adam | |
| 6,261,050 | B1 * | 7/2001 | Kuhns | 414/526 |
| 6,425,725 | B1 * | 7/2002 | Ehlers | 414/505 |

FOREIGN PATENT DOCUMENTS

| | | |
|---|---|---|
| GB | 2 198 417 A | 6/1988 |
| SU | 1207425 | 1/1986 |

* cited by examiner

*Primary Examiner*—James W. Keenan
(74) *Attorney, Agent, or Firm*—McKee, Voorhees & Sease, P.L.C.

(57) ABSTRACT

An improved trailer for transporting bulk seed boxes is provided. The trailer includes a bed, a hopper extending below the bed for receiving seed from the bulk seed box, and an auger for unloading seed from the hopper. The bed includes upwardly and outwardly extending guide plates to provide self-centering of the seed box when the box is loaded onto the bed with a forklift truck. The bed includes lock bars moveable between locked and unlocked positions to secure the seed box to the bed. The hopper includes a slide gate with a control arm connected to the gate and extending to the auger side of the trailer for moving the slide gate between open and closed position. The auger includes a foldable upper section which is pivotal between a folded transport position and an extended raised operative position. The folding of the upper auger section is facilitated by a gas cylinder and a lever arm.

19 Claims, 5 Drawing Sheets

TRAILER FOR TRANSPORTING BULK SEED BOXES

BACKGROUND OF THE INVENTION

Trailers are commonly used to transport bulk seed boxes and bags. The trailers are adapted to hold one or more boxes or bags, which normally are set onto the bed of the trailer using a hydraulic forklift. The loading process normally requires two steps. First, a box is lifted up and set partially onto the flat trailer bed. The forklift is then removed from the box, and then pushed against the box to get the box fully and squarely on the flat trailer bed. This two-step process is slow and time consuming. Pushing the box with the forks of the lift also subjects the box to damage.

Therefore, a primary objective of the present invention is the provision of an improved trailer for transporting bulk seed boxes.

Another objective of the present invention is the provision of an improved trailer for bulk seed boxes which is self-centering.

A further objective of the present invention is the provision of an improved trailer for bulk seed boxes which includes upwardly and outwardly sloped guide plates to facilitate loading of the box on the bed.

Another objective of the present invention is the provision of an improved trailer for transporting bulk seed boxes having lock bars on the bed to secure the box to the bed.

Still another objective of the present invention is the provision of an improved trailer for bulk seed boxes which allows the boxes to be quickly and easily locked to and unlocked from the trailer.

A further objective of the present invention is the provision of an improved trailer wherein the hopper of the trailer includes a discharge gate and a control arm connected to the gate and extending outwardly to a position adjacent the auger for manually moving the gate between open and closed positions.

Yet another objective of the present invention is the provision of an improved trailer for transporting bulk seed boxes having a foldable auger with first and second sections, and a gas cylinder extending between the sections to facilitate movement of the outer section between transport and discharge positions.

These and other objectives will become apparent from the following description of the invention.

BRIEF SUMMARY OF THE INVENTION

The improved trailer of the present invention is intended for use in transporting bulk seed boxes. A trailer includes a wheeled bed for supporting the boxes, a hopper extending below the bed for receiving seed from the bulk seed boxes, and a conveyor operatively connected to the hopper for unloading seed. The bed includes sloped guide plates extending upwardly and outwardly to automatically center the boxes on the bed when the boxes are set thereon. Lock bars are pivotally attached to the bed and extend across the front and back of the box to engage a lower flange on the box and thereby secure the box to the bed. The lock bars are secured in the locked position quickly and easily with a locking pin.

The hopper includes a gate moveable between a closed position for retaining seed in the hopper and an open position for discharging seed from the hopper. A control arm is connected at one end to the gate, and has an opposite end extending upwardly and outwardly to a location adjacent the conveyor, such that an operator can manually move the gate between the open and closed positions. The outer end of the control arm extends slidably through a support guide mounted on the side of the trailer.

The conveyor is preferably an auger including pivotally connected first and second sections, with the second section being movable between a transport position and a discharge position. A gas cylinder extending between the first and second sections facilitates movement of the second section between the transport and discharge positions. An extendable lever arm also facilitates movement of the second section between the transport and discharge positions.

DETAILED DESCRIPTION OF THE INVENTION

Figure 1:
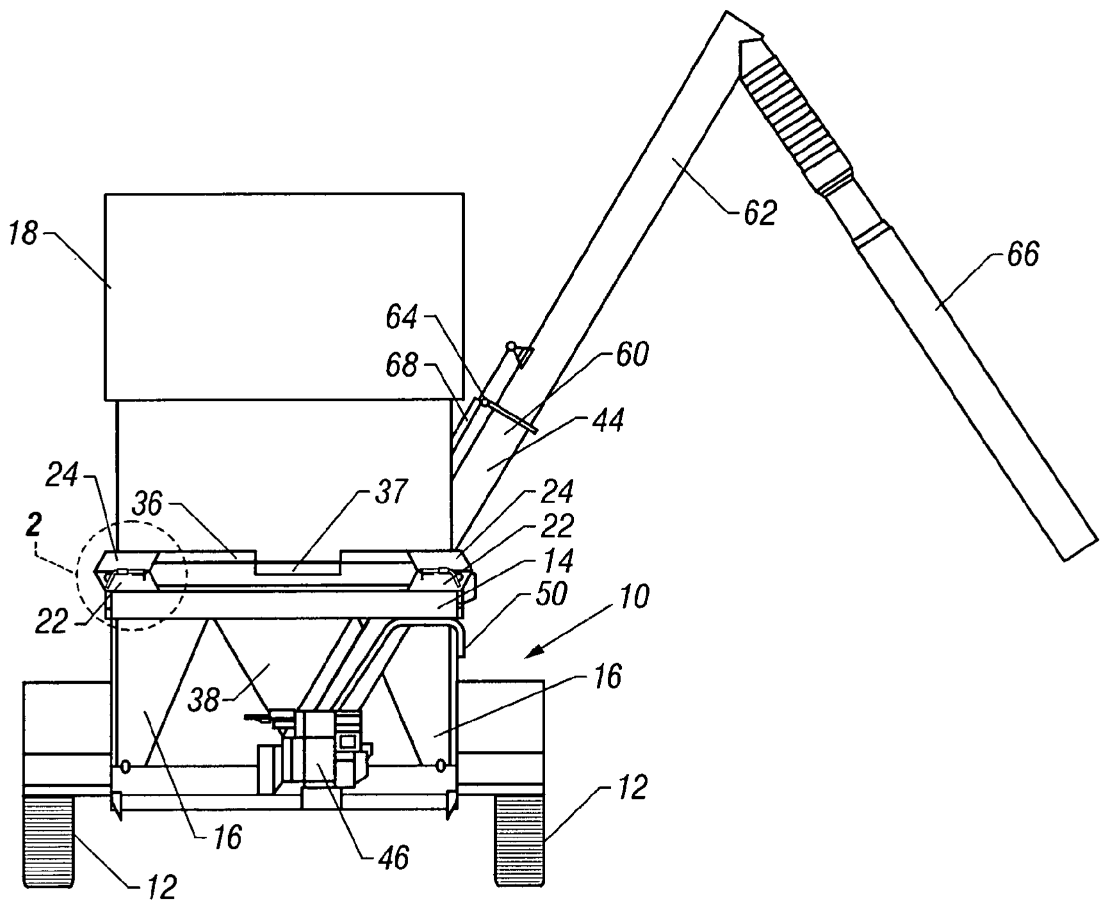
FIG. 1 is a rear perspective view of the improved trailer of the present invention with a seed box loaded thereon.

An improved trailer for transporting bulk seed boxes is generally designated in the drawings by the reference numeral 10. The trailer includes wheels 12 so that it is adapted to be towed by a vehicle, such as a tractor (not shown). The trailer 10 includes a flat elevated bed 14 supported by legs 16. The bed 14 is adapted to receive one or more bulk seed boxes 18.

The seed box 18 includes four sidewalls, a top and a bottom. Seed in the box 18 can be discharged through an opening in the bottom of the box, with the opening normally be closed by a gate. The box 18 is typically made of plastic, and includes channels in the bottom for receiving the forks of a lift vehicle. The seed box 18 includes a lower perimeter flange 20 extending around the sidewalls adjacent the bottom of the box. The construction of the seed box 18 is conventional and does not constitute a part of the present invention.

The bed 14 of the trailer 10 is provided with a plurality of upwardly and outwardly extending guide plates 22 that facilitate loading of the box 18 onto the bed 14. More particularly, the sloped guide plates 22 are positioned around the perimeter edge of the bed 14. Preferably, as shown in the drawings, the guide plates 22 are located at the corners of the bed 14. However, it is understood that the guide plates 22 are provided for each seed box position on the bed 14. Alternatively, the guide plates may be located on each side of the bed 14, or may be a continuous lip extending upwardly and outwardly around each seed box position of the bed 14. The guide plates 22 function to align or center the seed box 18 onto the bed 14 as the box is loaded by a forklift truck. Thus, the sloped guide plates 22 form a self-centering mechanism for quick and easy loading of the box 18 onto the trailer bed 14 in a single step. Once the box 18 is lowered by the forklift truck onto the bed 14, the box is automatically centered on the bed without the need to adjust the position of the box by pushing with the lift forks.

Figure 2:
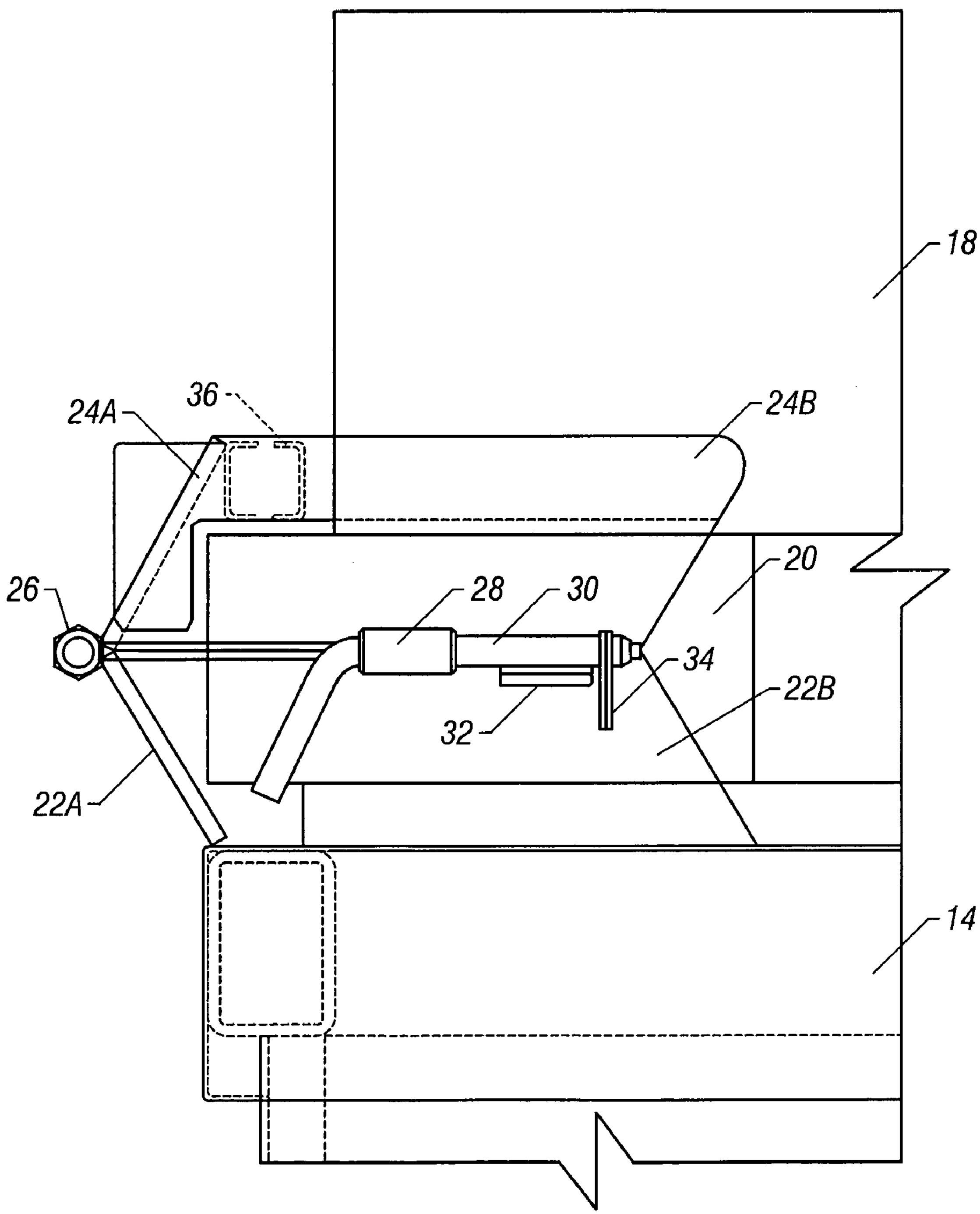
FIG. 2 is an enlarged view taken along lines 2—2 of FIG. 1, with a lock bar in the locked position.
Figure 3:
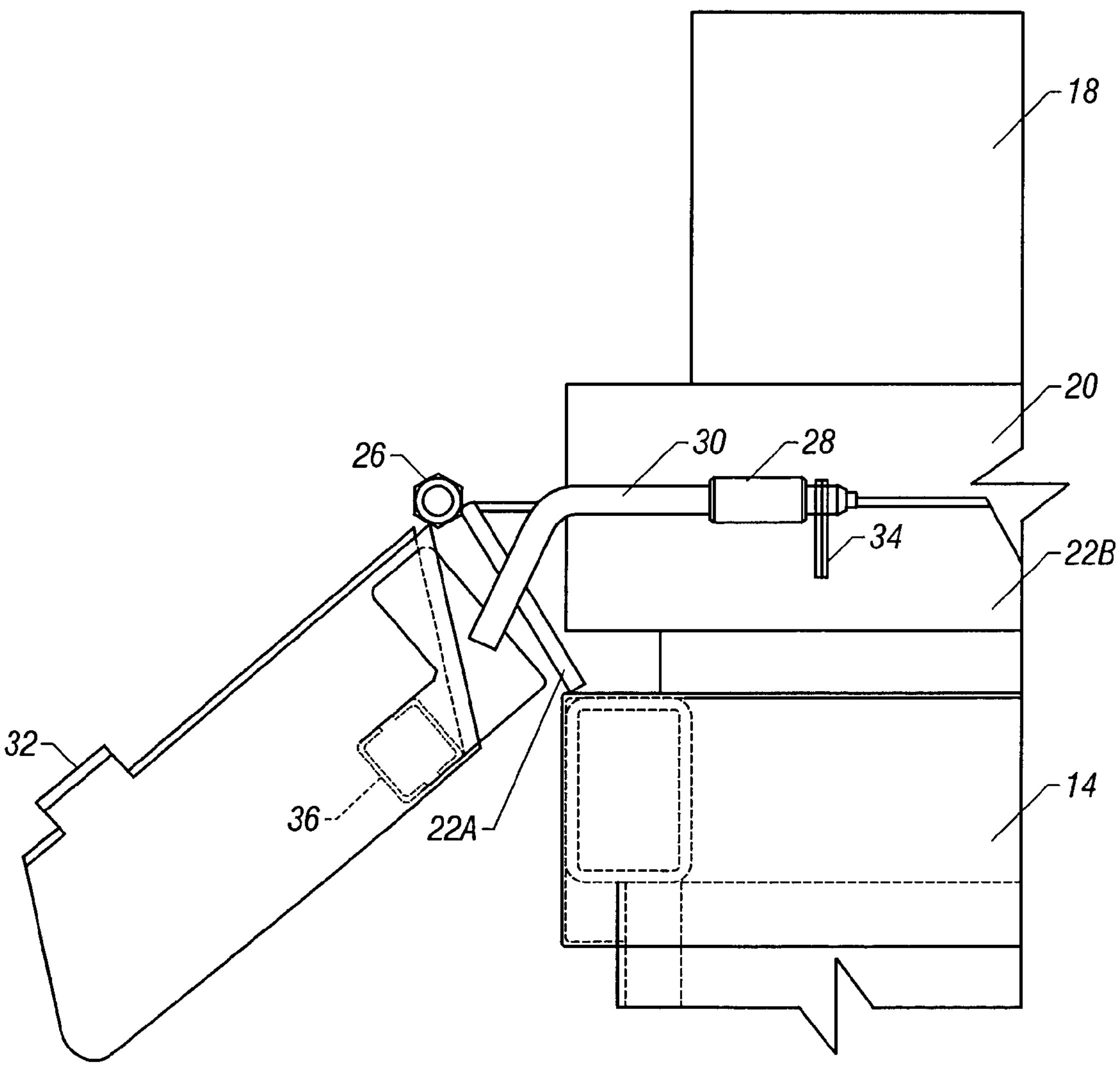
FIG. 3 is a view similar to FIG. 2 showing the lock bar in the unlocked position.

The trailer 10 includes a locking system for securing the seed box 18 to the bed 14. The lock system is associated with the guide plates 22. More particularly, as best seen in FIGS. 2 and 3, the lock system includes a corner clamp 24 connected to each corner guide plate 22 with a hinge 26. Each corner guide plate 22 includes left and right sections 22A, 22B, extending at right angles to one another. Similarly, each corner clamp 24 includes left and right sections 24A, 24B extending at right angles to one another. As seen in FIGS. 2 and 3, the left corner clamp section 24A is connected to the left guide plate section 22A by the hinge 26. The hinge 26 allows the corner clamp 24 to move between a closed or locking position shown in FIG. 2 to an open or unlocked position shown in FIG. 3. The right guide plate section 22B includes a collar 28 through which a locking pin 30 slidably and rotatably extends. The right corner clamp section 24B includes a lip 32. With the locking pin 30 in a retracted position, as shown in FIG. 3, the corner clamp 24 can be pivoted from the unlocked position (FIG. 3) to the locked position (FIG. 2). Then, the locking pin 30 can be rotated 90° such that the cotter or roll pin 34 will move past the lip 32, such that the locking pin 30 will extend over the lip 32 so as to maintain the corner clamp 24 in the locked position. The cotter or roll pin 34 and locking pin 30 are then rotated 90° whereby the cotter pin 34 prevents the locking pin 30 from being fully retracted past the lip 32. To move the corner clamp 20 from the locked position of FIG. 2 to the unlocked position of FIG. 3, the locking pin 30 is rotated 90° such that the cotter or roll pin 34 can move past the lip 32 and the locking pin 30 retracted from the collar 28.

Extending between the corner clamps 24 on the front and back of the bed 14 is a lock bar 36. Thus, the front corner clamps 24 are tied together by the lock bar 36, as are the back corner clamps. When the corner clamps 24 are pivoted to the locked position, the lock bar 36 extends over the perimeter flange 20 of the seed box 18, as seen in FIG. 2, so as to secure the box 18 to the bed 14. The lock bar 36 includes a drop down section 37 which provides access and clearance for the discharge gate (not shown) of the seed box.

The trailer bed 14 includes a hopper 38 with an open upper end and an open lower end 40 that is normally closed by a slide gate 42. The gate 42 is moveable between open and closed positions. When the gate 42 is in the open position, seed that has been discharged from the seed box 18 into the hopper 38 flows into the lower end of a conveyor, such as an auger 44. Auger flighting (not shown) extends through the auger 44. A motor 46 rotates the flighting so as to carry seed upwardly for unloading into a planter, seed drill, grain cart, wagon, or truck. It is understood that other types of conveyors can also be used.

Figure 4:
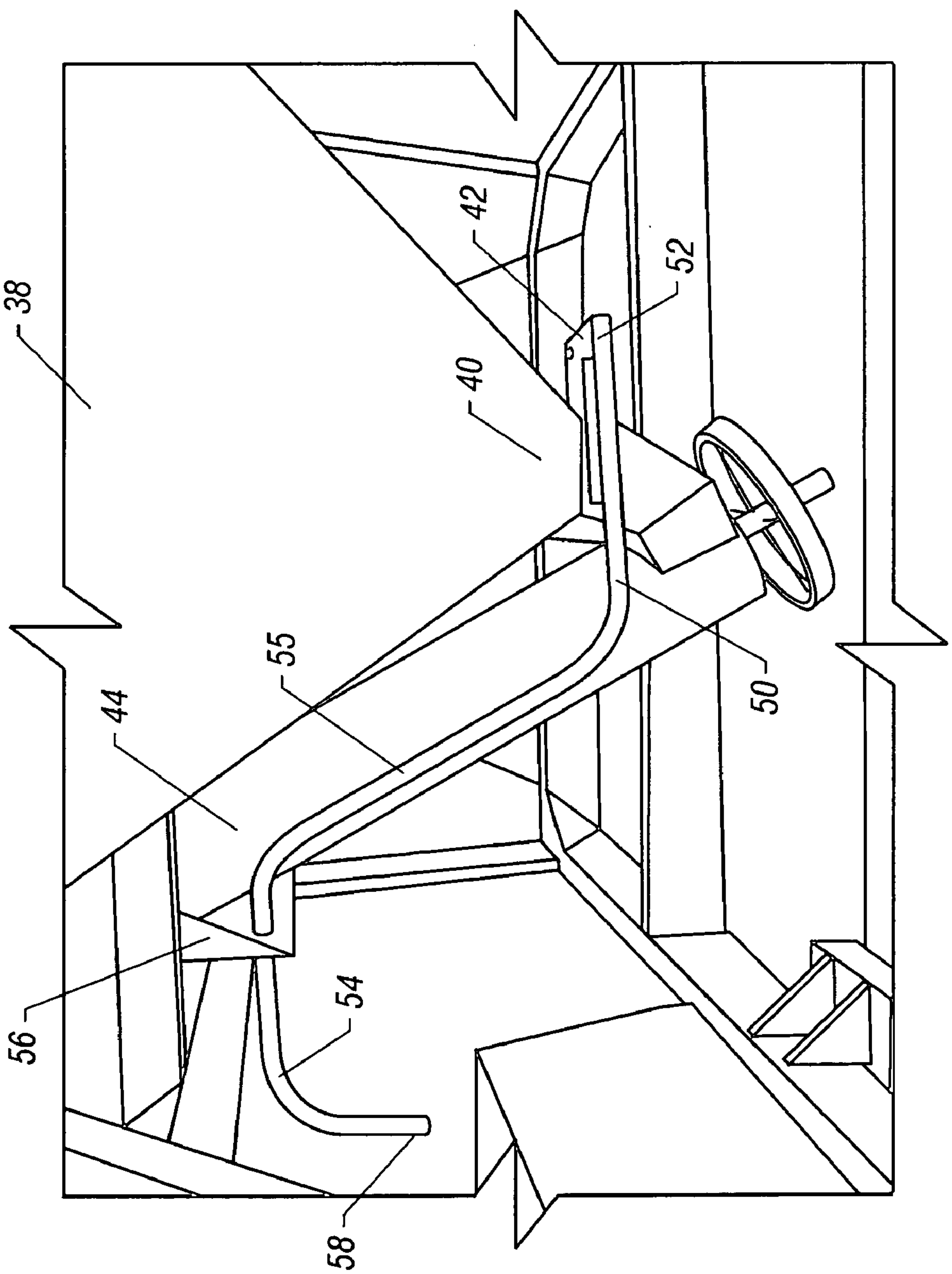
FIG. 4 is an enlarged front perspective view showing the hopper discharge gate and control arm, with the drive motor of the auger being not shown, for clarity.

A control arm 50 allows for manual opening and closing of the slide gate 42. The control arm 50 includes a lower end 52 connected to the slide gate 42, an upper end 54 extending to a position near the sidewall of the trailer 10, and an angled central portion 55 extending between the ends 52, 54. The upper end 54 of the control arm 50 extends through a support guide 56 on the trailer 10. The upper end 54 of the control arm 50 terminates in a handle 58 which can be gripped by an operator so as to move the control arm 50 in and out, as seen in FIG. 4 so as to open and close the slide gate 42, respectively. It is important to note that the handle 58 is located on the same side of the trailer 10 as the auger 44, such that the operator can watch the discharge of seed from the auger 44 while having access to the control arm 50.

Figure 5:
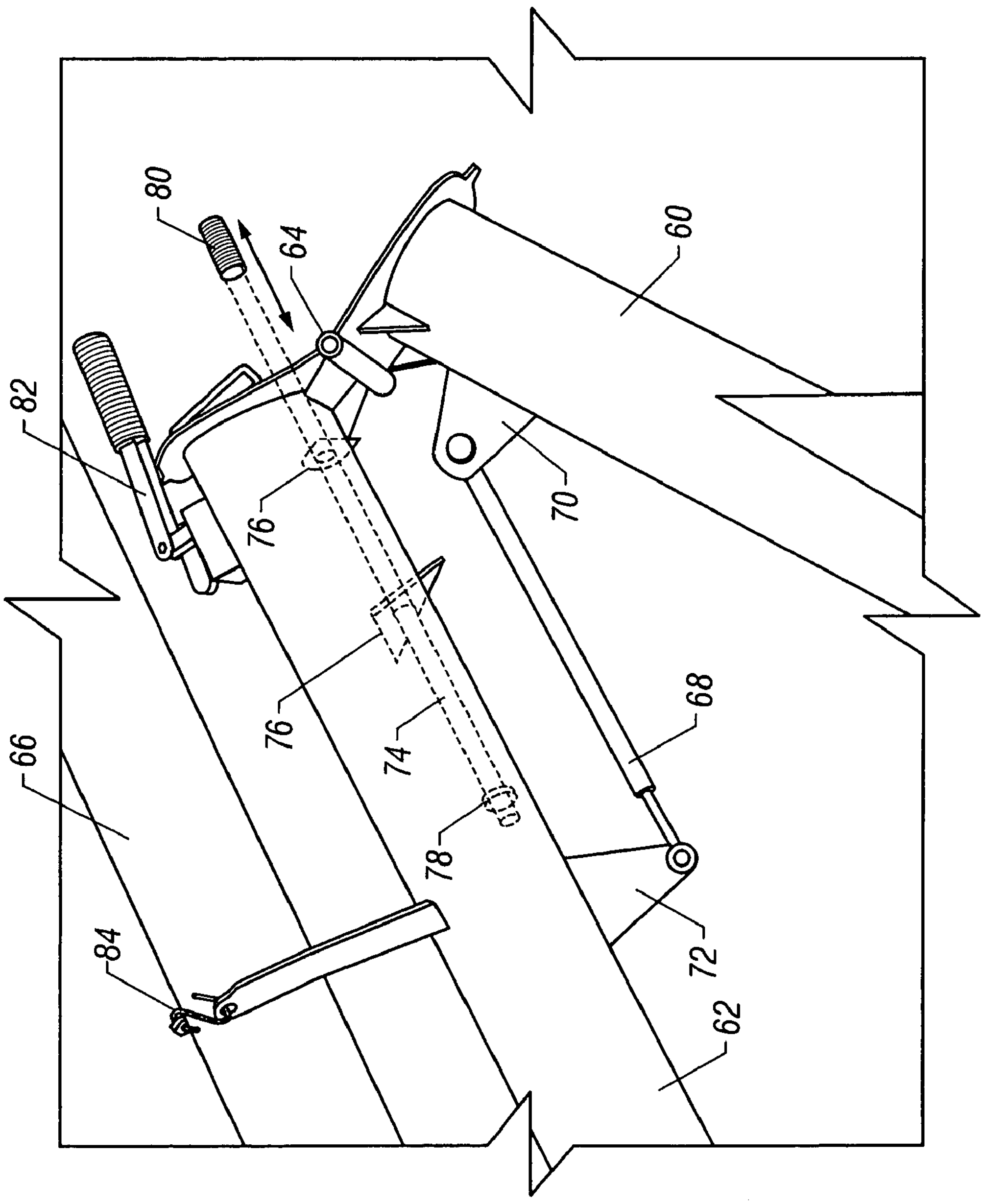
FIG. 5 is a partial perspective view showing the gas cylinder connected between the first and second auger sections, with the second section being pivoted to a transport position.

The auger 44 includes a lower section 60 and an upper section 62 which are pivotally connected by a hinge 64. Thus, the upper section 62 is pivotal relative to the lower section 60 between a folded transport position, shown in FIG. 5, and an extended operative position, shown in FIG. 1. A flexible tube 66 extends from the outer end of the upper auger section 62 for directing the discharge of the seed from the auger 44.

The folding of the upper auger section 62 relative to the lower section 60 is facilitated by a gas cylinder 68 having opposite ends connected to flanges 70, 72 on the lower and upper auger sections 60, 62, respectively. A lever arm 74 is provided on the upper auger section 62 to further facilitate the pivotal movement of the upper section 62 relative to the lower section 60. The lever arm 74 slidably extends through a pair of flanges 76 on the upper auger section 62. The rearward end of the lever arm 74 includes a pin 78 or other larger diameter portion so as to prevent the lever arm 74 from pulling through the flanges 76. The forward end of the lever arm 74 has a hand grip 80. When the lever arm 74 is extended outwardly, as shown in broken lines in FIG. 5, the hand grip 80 can be gripped by an operator and pulled downwardly to help pivot the upper auger section 62 upwardly to the raised position shown in FIG. 1.

A clamp mechanism 82 is provided on the upper auger section 62 so as to lock the upper section 62 to the lower section 60 when the upper section 62 is in the raised position. When the upper section 62 is folded to the transport position, the flexible tube 66 can be secured against movement by a hook 84 or other retaining member.

Whereas the invention has been shown and described in connection with the preferred embodiment thereof, it will be understood that any modifications, substitutions, and additions may be made which are within the intended broad scope of the following claims. From the foregoing, it can be seen that the present invention accomplishes at least all of the stated objectives.

What is claimed is:

1. An improved trailer for transporting a bulk seed box, the box having first and second sidewalls, a bottom, a top, and a flange extending along the sidewalls adjacent the bottom of the box, the trailer comprising:

- a wheeled bed for supporting a bulk seed box, the bed having a perimeter edge;
- a hopper extending below the bed for receiving seed from the bulk seed box;
- a conveyor operatively connected to the hopper for unloading seed from the hopper; and
- the bed having guide plates inclining upwardly and outwardly from the perimeter edge of the bed to facilitate centering of the box on the bed.

2. The improved trailer of claim 1 wherein the bed has four corners and the guide plates are located at the corners of the bed.

3. The improved trailer of claim 1 further comprising lock bars on the bed to overlappingly engage the flange of the seed box to secure the seed box to the bed.

4. The improved trailer of claim 3 wherein each lock bar is pivotally connected to the bed for movement between unlocked and locked positions.

5. The improved trailer of claim 4 further comprising pins on the bed adapted to selectively engage a portion of the lock bars to maintain the lock bars in the locked positions.

6. The improved trailer of claim 3 wherein the bed has a front end, a back end, and opposite sides, and the lock bars extend between opposite sides adjacent the front and back ends.

7. The improved trailer of claim 3 wherein the lock bars are pivotally mounted on the guide plates.

8. The improved trailer of claim 1 wherein the conveyor extends laterally away from the first sidewall, and the hopper includes a gate moveable between a closed position for retaining seed in the hopper and an open position for discharging seed from the hopper, and having a control arm connected to the gate and extending toward the first sidewall adjacent the conveyor.

9. The improved trailer of claim 1 wherein the conveyor is an auger including a first inner section and a second outer section pivotally attached to the first section for movement between transport and discharge positions, and including a gas cylinder to facilitate movement of the second section between the transport and discharge positions.

10. The improved trailer of claim 1 wherein each guide plate extends outwardly at an obtuse angle from the bed.

11. The improved trailer of claim 1 wherein the guide plates define an enlarged box entrance sloping downwardly and inwardly toward the bed so that the box will automatically center on the bed when loaded onto the bed.

12. An improved trailer for transporting a bulk seed box, the box having first and second sidewalls, a bottom, a top, and a flange extending along the sidewalls adjacent the bottom of the box, the trailer comprising:

a wheeled bed for supporting a bulk seed box, the bed having a perimeter edge;

a hopper extending below the bed for receiving seed from the bulk seed box;

a conveyor operatively connected to the hopper for unloading seed from the hopper;

lock bars on the bed to overlappingly engage the flange on the seed box to secure the seed box to the bed; and each lock bar being pivotally connected to the bed for movement between an unlocked position spaced outwardly from the perimeter edge of the bed and a locked position spaced inwardly from the perimeter edge of the bed.

13. The improved trailer of claim 12 further comprising pins on the bed adapted to selectively engage a portion of the lock bars to maintain the lock bars in the locked positions.

14. The improved trailer of claim 12 wherein the bed has a front end, a back end, and opposite sides, and the lock bars extend between opposite sides adjacent the front and back ends.

15. The improved trailer of claim 12 further comprising guide plates extending upwardly and outwardly from the bed to facilitate centering of the box on the bed.

16. The improved trailer of claim 15 wherein the lock bars are pivotally mounted on the guide plates.

17. The improved trailer of claim 16 wherein the bed has four corners and the guide plates are located at the corners of the bed.

18. The improved trailer of claim 12 wherein the conveyor extends laterally away from the first sidewall, and the hopper includes a gate moveable between a closed position for retaining seed in the hopper and an open position for discharging seed from the hopper, and having a control arm connected to the gate and extending toward the first sidewall adjacent the conveyor.

19. The improved trailer of claim 12 wherein the conveyor is an auger including a first inner section and a second outer section pivotally attached to the first section for movement between transport and discharge positions, and including a gas cylinder to facilitate movement of the second section between the transport and discharge positions.

* * * * *